Sept. 12, 1933.   H. ATWELL   1,926,831
MILK COOLING DEVICE
Filed July 25, 1931
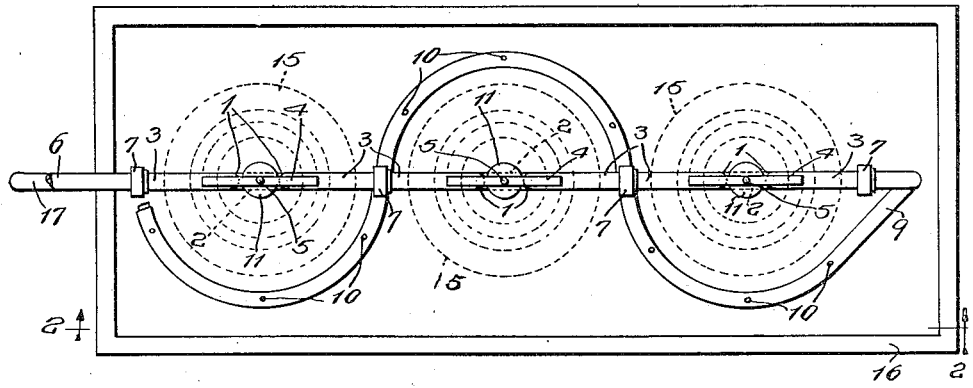
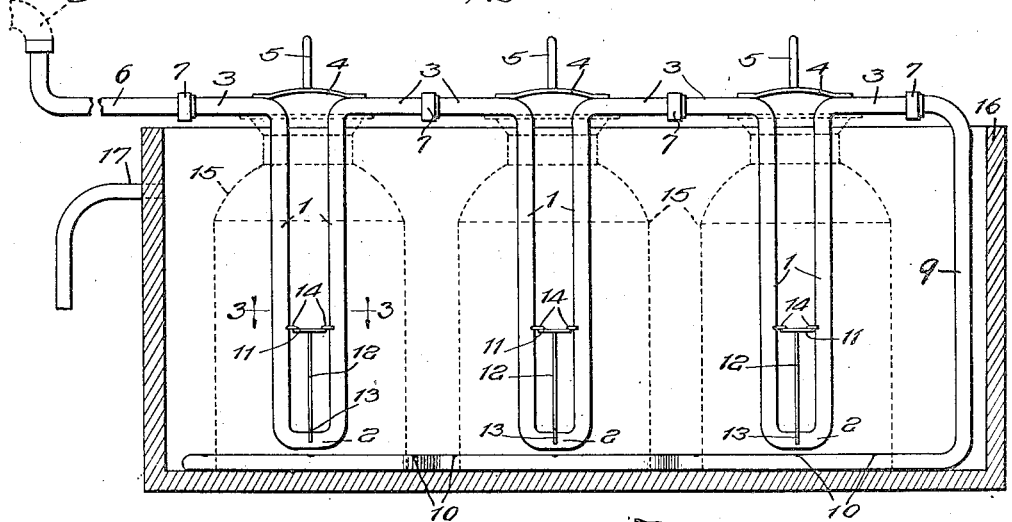
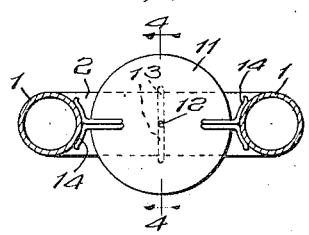
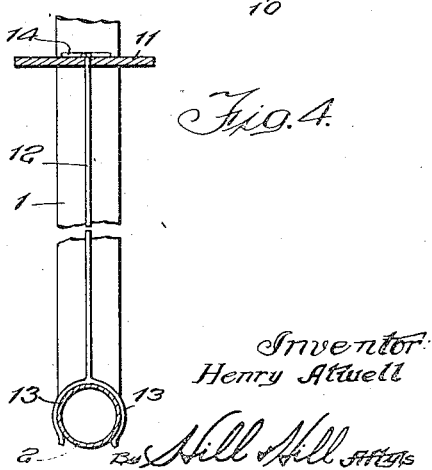
Inventor
Henry Atwell Patented Sept. 12, 1933

1,926,831

UNITED STATES PATENT OFFICE 1,926,831

MILK COOLING DEVICE

Henry Atwell, Lake Villa, Ill.

Application July 25, 1931. Serial No. 553,038

11 Claims. (Cl. 257—199)

My invention belongs to that general class of devices known as coolers or the like and refers more particularly to a simple, inexpensive device adapted for use by dairy farmers in removing the animal heat from the milk, preparatory to the transporting of the same to the dairy or milk company. Milk as it comes from cow is of body temperature, and it is necessary that the farmer removes the animal heat from the milk as quickly as possible, as it is desired that the same be at a temperature of approximately 60° when the same reaches the dairy or factory.

It has been generally the practice on a farm to set the can of milk in a trough of running water which reduces the temperature to a lower point, as the well water is ordinarily of a temperature below 60°. While this method of cooling may be satisfactory during a considerable portion of the year, in extremely hot weather it is found that it will not accomplish the reduction in temperature which is necessary.

My present device is designed for use by farmers for rapidly cooling one or several cans of fresh milk, although it will be obvious that the number of units which may be provided may be more or less unlimited.

The invention has among its objects the production of a device of the kind described which is simple, inexpensive, sanitary, durable, of light weight, efficient and satisfactory for use wherever found applicable.

It also has as an object, the production of a device of the kind described made up of units, so that the number of units may be increased or decreased so as to accommodate the number of cans that it may be desired to cool.

The invention also has among its objects the production of a device which may be conveniently manipulated or operated to stir or generally agitate the milk from time to time during the cooling.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawing,

Fig. 1 is a plan view of my improved device applied to a cooling trough;

Fig. 2 is a sectional view through the same, taken substantially on the line 2—2 of Fig. 1, illustrating three units;

Fig. 3 is a sectional view taken substantially on the line 3—3 of Fig. 2; and

Fig. 4 is a sectional view taken substantially on the line 4—4 of Fig. 3.

Referring to the drawing, each unit of my improved construction consists of a coil or loop consisting of the two legs or extensions 1—1, provided with an intermediate connecting part 2 at the bottom, the upper ends 3—3 being extended transversely, and of a length to extend to either side of the milk can when the device is positioned. The legs are of a length to extend adjacent the bottom of a can and at the top of the two legs is a bridge or connecting bar 4 which forms a grip for convenience in handling the device, either in applying to or removing it from the can, or during the cleansing, and at the same time, rigidly connects the two legs together and strengthens the unit. A rocking handle 5 may be placed at the top, if so desired, the purpose of the same being to rock the unit as set forth hereinafter. One of the extensions 3 is connected to a water supply hose 6 by means of a coupling, union or any equivalent means. The pipe 6 is connected to a source of water supply, as for example to the pump 8, only a portion of the pump being shown.

As shown in Fig. 2, the unit described is connected in series with the other units by means of couplings or unions 7, and the last unit is connected to a discharge conduit 9, which is preferably of some length and provided with discharge openings 10. The extreme end of the pipe 9 is closed so that the water must be discharged through the openings 10.

I have shown in Figs. 2, 3 and 4, an agitator 11, which may be secured on the unit, the same being preferably of simple construction and readily removable, so that it may be taken off for cleaning or when it is not desired to use the same. The device shown consists of a plate 11 of the desired size and shape, which is shown provided with a supporting and securing stem 12, which is forked as at 13, so that it may be detachably secured to the connecting part 2. It is maintained in position on the legs 1—1 by similar members 14—14.

I have shown in the drawing in dotted lines, milk cans 15 of conventional design, into which the milk is usually dumped after milking for transporting to the dairy. I have also illustrated a trough 16 of the desired size and shape, and made of suitable material, and which is constructed to contain water. This is shown provided with a drain pipe 17. Heretofore, cans have been placed in the trough, water being supplied from the pump 8, and discharged through the outlet 17, the cooling being entirely at the outside of the cans.

As mentioned before in extremely hot weather, the milk so treated is not sufficiently cooled, and it has been the practice of the factory to refuse the same. With the present construction the water circulates through the units, cooling the milk at the interior of the cans, thence flowing out where it is distributed throughout the tank, cooling the exterior of the cans and carrying off the heat, and thence discharged. It is preferred to make the conduits 6 and 9 of rubber hose or other flexible material and to make 9 of sufficient length so that it may be extended about the tank to distribute the cold water therein, the extreme free end, as before mentioned, being closed. The device is of light weight, and a plurality of units may be easily handled without effort, either to apply the devices to the cans or to remove the same therefrom. To remove or apply, the device is handled by means of the handle 4, rather than by grasping the legs, so that after the device has been sterilized, it may be handled without contaminating the loop legs which depend into the milk. If it is desired to agitate the milk to any extent, the units may be raised and lowered in the container or can 15, this being particularly efficient if the agitator plate 11 is employed. Where it is not desired to raise and lower the device, it may be rocked in the can by means of the rocking lever 5, the rocking serving also to agitate the milk. In this connection, owing to the flexible hose connectors, considerable movement is permitted, and of course, the couplings 7 may be so constructed as to prevent swivelling without leakage of water. It will be noted by referring particularly to Fig. 2, that if any of the couplings should leak, the same are sufficiently distant from the mouth of the can so that such leakage will drop into the trough rather than into the can. Obviously the conduit or tubular element 9 may be flexed so as to surround a container in any manner desired. The loop may be given any finish desired, preferably such a one that will prevent corrosion from contact with the milk or from the water.

It is found that by using the device, which is very inexpensive to construct and easily cleaned, that the time required for cooling the milk and removing the animal heat is greatly reduced, it being possible for the farmer to save time in cooling, and likewise bringing his milk to the factory with a temperature sufficiently low to pass inspection.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. An apparatus of the kind described consisting of a fluid conduit formed with a loop intermediate its ends, the ends being offset transversely at either side of the top of the loop, a supply conduit detachably connected to one end, and a flexible discharge conduit connected to the other end and being of a length to extend downwardly to the base of a container and at least partially around said container within which the loop may be positioned, said discharge conduit being closed at its extreme end, and provided with spaced discharge openings in the wall thereof of a character to direct a fluid upwardly about said container.

2. A cooling apparatus of the character described constructed for association with a container for cooling a commodity therein, said apparatus consisting of a conduit adapted to conduct a cooling medium, a length of said conduit being designed to extend into the container and provided with means for agitating the commodity, and a length of said conduit being of a character capable of being flexed to surround said container and provided with a plurality of apertures, through which the cooling medium is dispersed against the container.

3. A cooling apparatus of the character described, including in combination a trough, a container adapted to contain a commodity to be cooled arranged in the trough and means for conducting a cooling medium for cooling the commodity in said trough with a section thereof arranged in the container, and with a flexible section arranged within the trough and of a length sufficient to surround said container.

4. A cooling apparatus of the character described, including in combination a trough, a container adapted to contain a commodity to be cooled arranged in the trough and means for conducting a cooling medium for cooling the commodity in said trough with a flexible section thereof arranged about the container, and a rigid section arranged within the container and provided with means for rocking same to agitate the commodity as desired.

5. A cooling apparatus of the character described constructed for association with a trough and a container for cooling a commodity in the container, said apparatus consisting of a conduit adapted to conduct a cooling medium, a length of said conduit being designed to extend into the container and provide with means for agitating the commodity, and a length of said conduit arranged in the trough and being of a character capable of being flexed to surround said container and provided with a plurality of apertures through which the cooling medium is dispersed against the container into the trough.

6. A cooling apparatus of the character described, including in combination a trough, a container adapted to contain a commodity to be cooled arranged in the trough and means for conducting a cooling medium for cooling the commodity in said trough with a flexible section thereof arranged about the container and provided with apertures through which the cooling medium is dispersed against the container into the trough and a section connected with the first-mentioned section arranged within the container, and adapted to be rocked to agitate the commodity as desired.

7. A cooling apparatus of the character described constructed for association with a trough and a container for cooling a commodity in the container, said apparatus consisting of a conduit adapted to conduct a cooling medium, a length of said conduit being rigid and designed to connect with a similar length, each being adapted to extend into a container and be rocked as desired and provided with means detachably secured to the length for agitating the commodity, and a length of said conduit arranged adjacent the bottom of the trough and of a character capable of being flexed to surround said container and being provided with a plurality of apertures through which the cooling medium is dispersed upwardly about the container into the trough.

8. An apparatus of the kind described comprising the combination of a rigid conduit and a flexible conduit, the former being provided with an extension adapted to extend into a container and the latter conduit being of a length sufficient to extend to the base of said container and surround same, and of a character to release a fluid circulating through the conduits in a manner to direct the fluid upwardly about the container.

9. An apparatus of the kind described comprising the combination of a rigid conduit having an extension and a flexible conduit, the ends of the former being arranged to overlie the top of a container to support the extension therein, and the latter conduit being of a length to extend to the lower part of said container and surround same, and of a character to release a fluid passing through the conduits and direct the fluid upwardly about the container.

10. A cooling apparatus of the character described constructed for association with a trough and a container for cooling a commodity in the container, said apparatus consisting of a conduit adapted to conduct a cooling medium, a length of said conduit formed to provide a loop designed to extend into the container and provided with means for agitating the commodity, means providing a bridge between the ends of said loop and means connected to said bridge providing means whereby said length may be rocked, and a length of said conduit arranged in the trough and being of a character capable of being flexed to surround said container and provided with a plurality of apertures through which the cooling medium is dispersed against the container into the trough.

11. In an apparatus of the kind described consisting of a fluid conduit formed with a loop intermediate its ends, the ends being offset transversely at either side of the top of the loop, a supply conduit detachably connected to one end, and a flexible discharge conduit of a length sufficient to extend downwardly and surround the lower part of a container connected to the other end, said discharge conduit closed at its extreme end and provided with spaced discharge openings in the wall thereof of a character to direct a fluid upwardly about the container.

HENRY ATWELL.